(12) United States Patent
Peglowski

(10) Patent No.: US 10,018,230 B2
(45) Date of Patent: Jul. 10, 2018

(54) PERMANENTLY ENGAGED STARTER WITH DRY FRICTION CLUTCH

(71) Applicant: BorgWarner Inc., Auburn Hills, MI (US)

(72) Inventor: Brett Peglowski, Oakland, MI (US)

(73) Assignee: BorgWarner Inc., Auburn Hills, MI (US)

(*) Notice: Subject to any disclaimer, the term of this patent is extended or adjusted under 35 U.S.C. 154(b) by 25 days.

(21) Appl. No.: 15/263,623

(22) Filed: Sep. 13, 2016

(65) Prior Publication Data

US 2018/0073568 A1 Mar. 15, 2018

(51) Int. Cl.

| F02N 11/08 | (2006.01) |
|---|---|
| F16D 13/16 | (2006.01) |
| F16D 41/07 | (2006.01) |
| F16D 41/12 | (2006.01) |
| F16D 43/18 | (2006.01) |
| F16D 41/06 | (2006.01) |
| F16D 41/066 | (2006.01) |

(52) U.S. Cl.
CPC .......... *F16D 13/16* (2013.01); *F02N 11/0851* (2013.01); *F16D 41/07* (2013.01); *F16D 41/12* (2013.01); *F16D 43/18* (2013.01); *F16D 41/066* (2013.01); *F16D 2041/0603* (2013.01)

(58) Field of Classification Search
CPC ...... F02N 11/00; F02N 11/08; F02N 11/0851; F02N 15/02; F16D 13/16; F16D 41/07; F16D 41/12; F16D 43/18

USPC .... 123/179.1, 179.22, 179.25, 185.1, 185.11
See application file for complete search history.

(56) References Cited

U.S. PATENT DOCUMENTS

| 6,364,042 B1 | 4/2002 | Joachim | |
|---|---|---|---|
| 8,240,286 B2 | 8/2012 | Li et al. | |
| 2011/0168118 A1* | 7/2011 | Li | B60K 6/383 |
| | | | 123/179.25 |
| 2011/0168119 A1* | 7/2011 | Steele | F02N 15/023 |
| | | | 123/179.25 |
| 2012/0055436 A1* | 3/2012 | Antchak | F02N 15/022 |
| | | | 123/179.25 |
| 2012/0234281 A1* | 9/2012 | Steele | F02N 15/022 |
| | | | 123/179.25 |
| 2013/0081588 A1* | 4/2013 | Antchak | F02N 15/022 |
| | | | 123/179.1 |
| 2014/0245984 A1* | 9/2014 | Seillier | F02N 15/025 |
| | | | 123/185.1 |
| 2014/0305396 A1* | 10/2014 | Steele | F16D 41/067 |
| | | | 123/179.25 |

* cited by examiner

*Primary Examiner* — John Kwon
*Assistant Examiner* — Johnny H Hoang
(74) *Attorney, Agent, or Firm* — Harness, Dickey & Pierce, P.L.C.

(57) ABSTRACT

An engine starter that includes a starter motor, a ring gear, a pinion driven by the starter motor and meshingly engaged with the ring gear, a disk that is configured to be coupled to an engine crankshaft for common rotation, and a dry clutch that is configured to selectively couple the ring gear to the disk.

4 Claims, 3 Drawing Sheets

PERMANENTLY ENGAGED STARTER WITH DRY FRICTION CLUTCH

FIELD

The present disclosure relates to a starter for an internal combustion engine that employs a dry friction clutch.

BACKGROUND

This section provides background information related to the present disclosure which is not necessarily prior art.

Engine starters for modern automotive vehicles are commonly configured as a Bendix-type starter in which rotation of the starter motor causes a starter pinion, which is mounted on the output shaft of the starter motor, to translate along its rotational axis into engagement with a ring gear that is coupled to a flex plate or a flywheel. There are several drawbacks an engine starter of this type is integrated into a vehicle that uses a start-stop control algorithm to turn the internal combustion engine off when the vehicle has no velocity (relative to the road that it is operating on) and the vehicle brake pedal has been depressed for a predetermined amount of time. One drawback concerns the relatively long amount of time that is needed to operate the engine starter. Another drawback concerns the durability of such engine starters, given that the frequency of engine starting is many times more frequent in when a vehicle is operated in a start-stop mode.

SUMMARY

This section provides a general summary of the disclosure, and is not a comprehensive disclosure of its full scope or all of its features.

In view of the above-discussion, an improved engine starter is needed in the art. The engine starter is preferably a permanently engaged starter (i.e., a starter having a starter pinion that is meshingly engaged to a ring gear mounted to a flex plate or flywheel) and utilizes clutch that does not require wet (liquid) lubrication in the form of an oil or transmission fluid.

In one form, the present teachings provide an engine starter that includes a starter motor, a ring gear, a pinion driven by the starter motor and meshingly engaged with the ring gear, a disk that is configured to be coupled to an engine crankshaft for common rotation, and a dry clutch that is configured to selectively couple the ring gear to the disk.

In another form, the present teachings provide an engine starter that includes a starter motor, a pinion, a ring gear, a shoe engagement structure, a flex plate, an arm and a spring. The starter motor has an output shaft to which the pinion is fixed. The ring gear is meshingly engaged to the pinion. The shoe-engagement structure is coupled to the ring gear. The flex plate is configured to be coupled to an engine crankshaft for common rotation. The arm is coupled to the flex plate for pivoting motion about a pivot point. The arm has a shoe and a counter mass. The spring biases the arm about the pivot point to urge the shoe toward the shoe-engagement structure. The counter mass is configured to counteract the spring and drive the shoe away from the shoe-engagement structure when a rotational speed of the flex plate is greater than or equal to a predetermined rotational speed.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
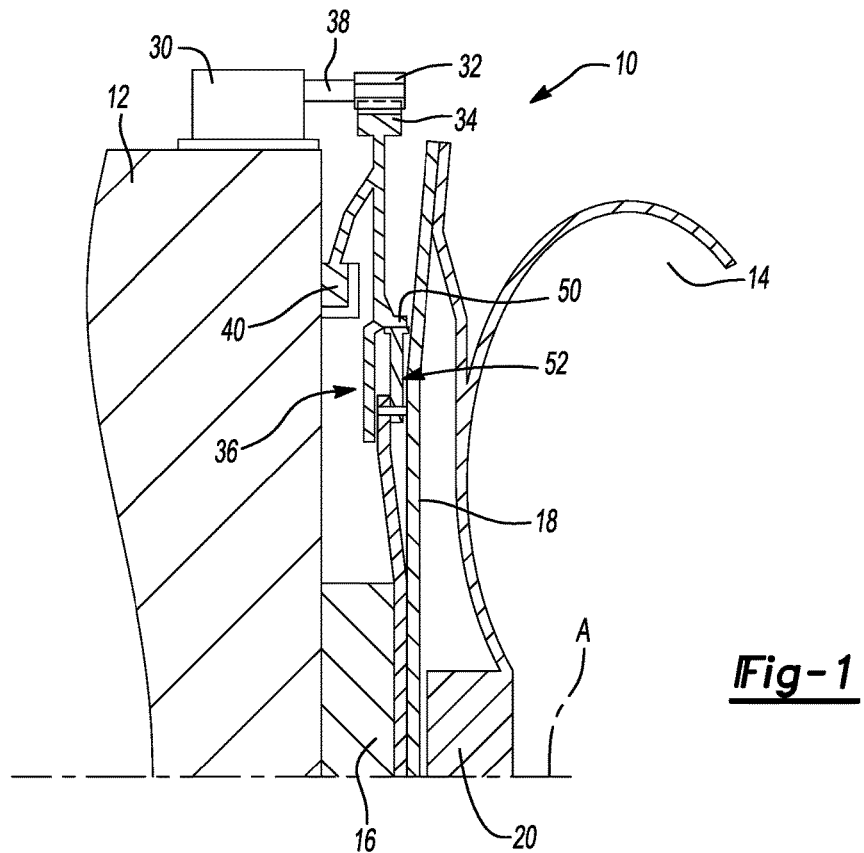
FIG. 1 is a schematic cross-sectional view of an engine starter constructed in accordance with the teachings of the present disclosure, the engine starter being shown in operative association with an internal combustion engine and a torque converter.

With reference to FIG. 1, an engine starter constructed in accordance with the teachings of the present disclosure is generally indicated by reference numeral 10. The engine starter 10 can be disposed axially between an internal combustion engine 12 and a torque converter 14. The engine 12 can include a crankshaft 16 and a flex plate 18 (or flywheel—not shown) that can be coupled to an input 20 of the torque converter 14.

The engine starter 10 includes a starter motor 30, a starter pinion 32, a ring gear 34, and a starter clutch 36. The starter motor 30 can be a conventionally constructed electric motor having an output shaft 38 to which the starter pinion 32 is fixedly coupled. The ring gear 34 is an annular structure that is disposed about and is rotatable relative to the crankshaft 16 of the internal combustion engine 12. In the particular example provided, the ring gear 34 is supported for rotation relative to the engine 12 by a bearing 40. The starter pinion 32 is meshingly engaged to the ring gear 34 on a full-time basis. It will be appreciated that operation of the starter motor 30 can cause rotation of the starter pinion 32, which can drive the ring gear 34 about its rotational axis A. The starter clutch 36 can selectively couple the ring gear 34 to the flex plate 18 for common rotation.

Figure 2:
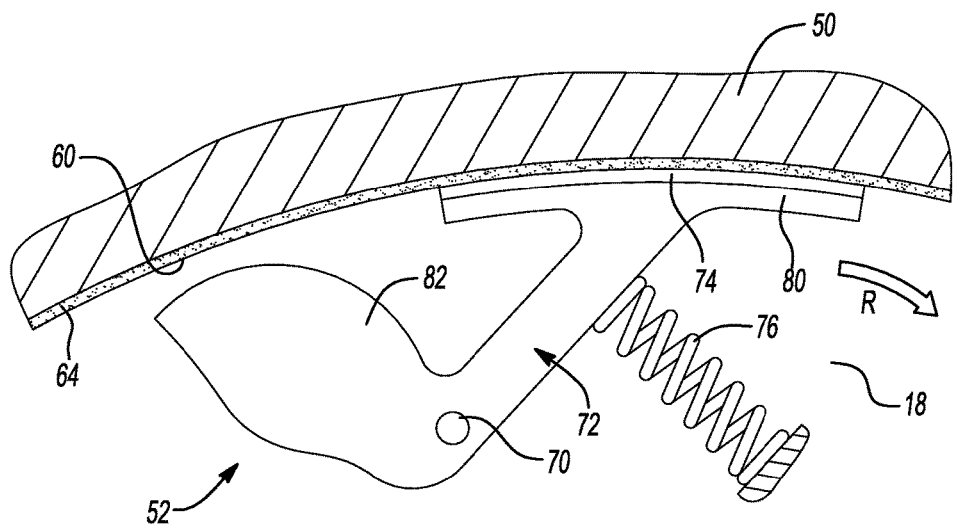
FIG. 2 is a front elevation view of a portion of the engine starter of FIG. 1.

With additional reference to FIG. 2, the starter clutch 36 includes a clutch input member 50 and a plurality of centrifugal clutch assemblies 52. The clutch input member 50 can be an annular structure that can be coupled to or formed on the ring gear 34. The clutch input member 50 can have a bore formed therein that defines a circumferential clutch surface 60. If desired, the clutch input member 50 can comprise a wear-resistant component 64. The wear-resistant component 64 could be formed as a discrete component that is assembled to or embedded in (e.g., cast into) a remaining portion of the clutch input member 50 (i.e., that portion of the clutch input member 50 other than the wear-resistant component 64), or could be a discrete coating or layer formed onto or into the remaining portion of the clutch input member 50.

Each of the centrifugal clutch assemblies 52 can include a pivot pin 70, an arm or clutch member 72, a friction shoe 74 and a biasing spring 76. Each pivot pin 70 can be fixedly coupled to the flex plate 18 and the pivot pins 70 can be spaced circumferentially about the flex plate 18 in a symmetrical manner.

Each of the clutch members 72 can be pivotably mounted to an associated one of the pivot pins 70 and can include a shoe mount 80 and a counterweight 82. The shoe mount 80 is configured to receive the friction shoe 74 thereon, such that the friction shoe 74 is presented relative to the clutch surface 60 in a desired manner. In the example provided, the friction shoe 74 comprises a friction material that is fixedly coupled to the shoe mount 80 in an appropriate manner, such as bonding. As such, the shoe mount 80 is elongated in a circumferential direction. It will be appreciated that the shoe mount 80 could be formed differently. For example, the shoe mount 80 could comprise a mount having features, such as snap-lock lugs or threaded apertures, that permit a clutch shoe (that comprises a shoe mount and the friction material) to be fixedly coupled thereto. The counterweight 82 is configured to cause the clutch member 72 to pivot about the pivot pin 70 in relation to centrifugal force imparted to the clutch member 72 during rotation of the flex plate 18.

The friction shoe 74 is configured to engage clutch surface 60 so that rotary power can be transmitted from the clutch input member 50 through the centrifugal clutch assemblies 52 to the flex plate 18 to cause corresponding rotation of the crankshaft 16. The friction shoe 74 can include a friction material that is configured with predetermined tribological properties. In the particular example provided, the predetermined tribological properties permit the friction shoe 74 to engage and disengage the clutch surface 60 in the absence of a wet lubricant (i.e., oil). Accordingly, the starter clutch 36 is a "dry clutch" in the particular example provided.

The biasing spring 76 can be configured to bias the clutch member 72 about the pivot pin 70 in a direction that urges the shoe mount 80 toward the clutch surface 60. While the biasing spring 76 is depicted schematically in FIG. 2 as being a coil spring, those of skill in the art will appreciate that the biasing spring 76 can be configured in any desired manner from any desired material.

When the engine 12 and the starter motor 30 are not operating, the crankshaft 16, the ring gear 34 and the flex plate 18 are not rotating and consequently, the biasing springs 76 are able to pivot their associated clutch members 72 about their associated pivot pin 70 so that the friction material of the friction shoe 74 is engaged to the clutch surface 60.

The starter motor 30 can be operated to drive the starter pinion 32 and thereby rotate the ring gear 34 in the direction of arrow R in FIG. 2. The biasing spring 76 is sufficiently strong so as to maintain the friction shoe 74 in engagement with the clutch surface 60 so that rotary power provided by the starter motor 30 is transmitted through the starter pinion 32, the ring gear 34, the starter clutch 36 to the flex plate 18 to drive the crankshaft 16 to start the engine 12.

The rotational speed of the crankshaft 16 and flex plate 18 can increase as the engine 12 is started and centrifugal forces acting on the counterweight 82 of each of the clutch members 72 cause the clutch members 72 to begin to rotate about their associated pivot pins 70 so that the friction shoe 74 pivots away from the clutch surface 60. When the crankshaft 16 and the flex plate 18 are running at a predetermined rotational speed, which is typically a rotational speed slightly lower than an idle speed of the engine 12, the friction shoes 74 are completely disengaged from the clutch surface 60.

Figure 3:
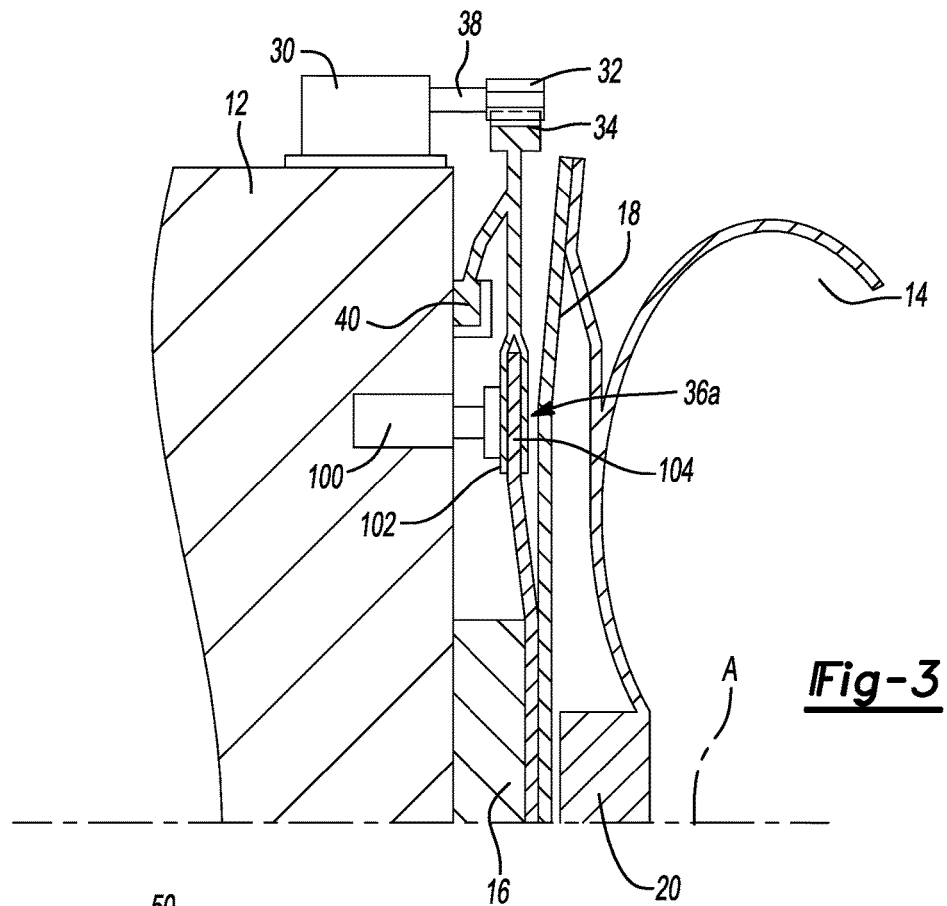
FIG. 3 is a schematic cross-sectional view similar to that of FIG. 1 but illustrating a second engine starter constructed in accordance with the teachings of the present disclosure.

The example of FIG. 3 is similar to that of FIGS. 1 and 2, except that the starter clutch 36a is configured as an axially engaged friction clutch having a clutch actuator 100 that is selectively operated to drive a first friction plate 102, which is coupled for rotation with one of the ring gear 34 and the flex plate 18, into engagement with a second friction plate 104 that is coupled for rotation with the other one of the ring gear 34 and the flex plate 18. The clutch actuator 100 can be any type of actuator that can be configured to translate the first friction plate 102 into engagement with the second friction plate 104. A return spring (not shown) can be employed to bias the first friction plate 102 away from the second friction plate 104 so that the starter clutch 36a is normally disengaged. One or both of the first and second friction plates 102 and 104 can comprise a friction material having predetermined tribological properties that permit the first and second friction plates 102 and 104 to engage and disengage one another in the absence of a wet lubricant (i.e., oil).

Figure 4:
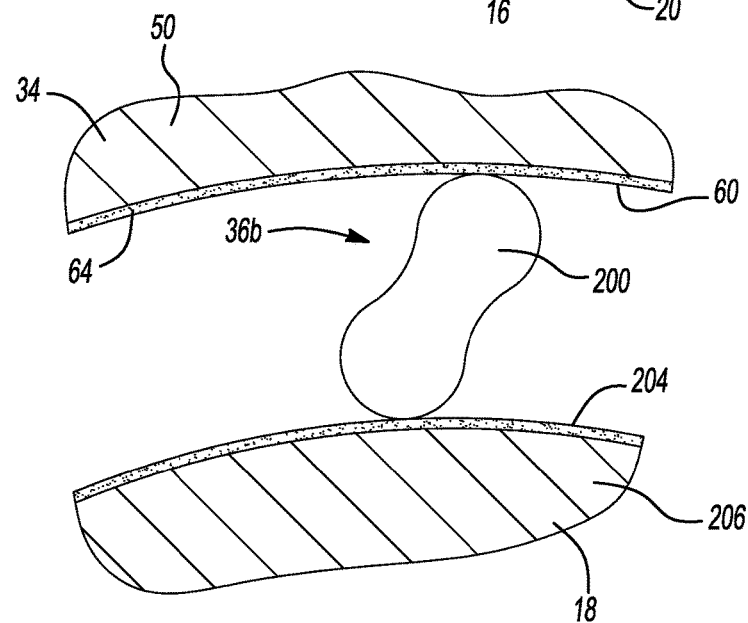
FIG. 4 is a front elevation view of a portion of a third engine starter constructed in accordance with the teachings of the present disclosure.
Figure 5:
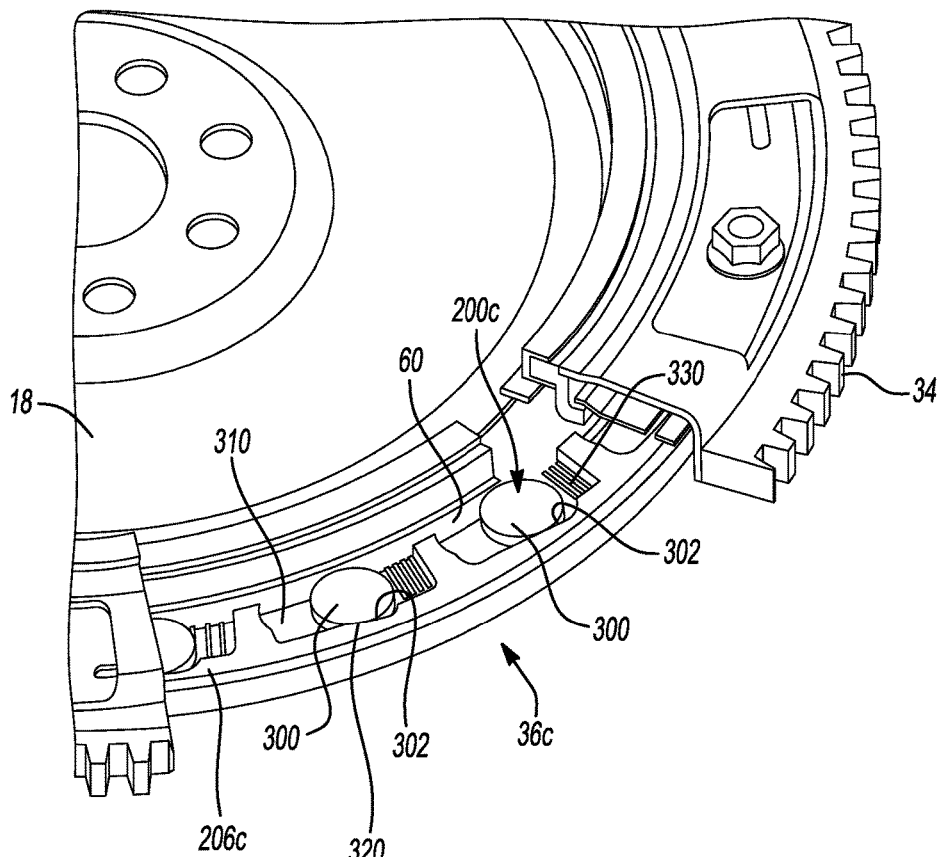
FIG. 5 is a perspective, partly sectioned view of a fourth engine starter constructed in accordance with the teachings of the present disclosure.

The examples of FIGS. 4 and 5 depict the starter clutch as being types of sprag clutches. In the example of FIG. 4, the starter clutch 36b comprises a plurality of figure 8-shaped sprags 200 that are configured to pivot between the clutch surface 60 and an external circumferential surface 204 formed on a clutch output member 206 that is coupled to the flex plate 18 for common rotation. Rotation of the clutch surface 60 (via rotation of the ring gear 34) relative to the circumferential surface 204 of the clutch output member 206 in a predetermined rotational direction causes the sprags 200 to pivot slightly so as to drivingly engage both the clutch surface 60 and the circumferential surface 204 of the clutch output member 206 so that rotary power can be transmitted from the ring gear 34 to the flex plate 18. Rotation of the clutch surface 60 relative to the circumferential surface 204 of the clutch output member 206 in a rotational direction opposite the predetermined rotational direction (i.e., when the circumferential surface 204 of the clutch output member 206 rotates in the predetermined rotational direction at a speed that is greater than a rotational speed of the clutch surface 60 in the predetermined rotational direction), the sprags 200 pivot slightly in an opposite direction and disengage the clutch surface 60 and the circumferential surface 204 of the clutch output member 206 to permit the flex plate 18 to rotate independently of the ring gear 34. It will be appreciated that the sprags 200, the clutch surface 60 and/or the circumferential surface 204 of the clutch output member 206 could be formed in whole or in part by a coating or layer of material. It will be appreciated that the sprags 200, the clutch surface 60 and/or the circumferential surface 204 of the clutch output member 206 could be configured to have predetermined tribological properties that permit the sprags 200 to engage and disengage the clutch surface 60 and the circumferential surface 204 of the clutch output member 206 in the absence of a wet lubricant (i.e., oil).

In the example of FIG. 5, the sprags 200c are configured somewhat differently than the sprags 200 of FIG. 4. In this regard, the sprags 200c have a disk-shaped body 300 with a cylindrical circumferential edge 302 that extends about the body 300. The disk-shaped body 300 can be received in a circumferentially-extending pocket 310 formed in the clutch output member 206c such that a circumferential edge of the sprag 200c can be rollingly disposed on the clutch surface

60. Each of the sprags 200c can be received into an associated one of the cam follower tracks 320 formed into the clutch output member 206a and can move relative to the cam follower track 320 between a first position (shown in FIG. 5), in which the sprag 200c is not wedged between the clutch surface 60 and the cam follower track 320 so as to permit relative rotation between the ring gear 34 and the flex plate 18, and a second position in which the sprag 200c is wedged between the clutch surface 60 and the cam follower track 320 so as to couple the ring gear 34 to the flex plate 18 for common rotation. A sprag spring 330 can be received between the clutch output member 206 and the sprag 200c and can bias the sprag 200c toward the first position. Rotation of the ring gear 34 relative to the flex plate 18 in the predetermined rotational direction causes the sprags 200c to roll on the clutch surface 60 toward their second positions such that the cam follower tracks 320 edges 302 to wedge the sprags 200c between the clutch surface 60 and the cam follower tracks 320 so that the flex plate 18 rotates with the ring gear 34. Rotation of the ring gear 34 relative to the flex plate 18 in the rotational direction opposite the predetermined rotational direction causes the sprags 200c to roll on the clutch surface 60 toward their first positions so that the sprags 200c are not wedged to the clutch surface 60 and the cam follower tracks 320 and the flex plate 18 can rotate independently of the ring gear 34.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An engine starter comprising:
a starter motor;
a ring gear;
a pinion driven by the starter motor and meshingly engaged with the ring gear;
a disk that is adapted to be coupled to an engine crankshaft for common rotation; and
a dry clutch that is configured to selectively couple the ring gear to the disk, the dry clutch having a clutch surface, which is coupled to the ring gear for rotation there with, and a plurality of clutch assemblies, each of the clutch assemblies having a pivot pin, a clutch member, a friction shoe and a biasing spring, each of the pivot pins being fixedly coupled to the disk, each of the clutch members being pivotably coupled to an associated one of the pivot pins, each of the friction shoes being fixedly mounted to an associated one of the clutch members so that rotation of the clutch members about their corresponding pivot pins causes corresponding movement of the friction shoes between a first position, in which the friction shoes are engaged to the clutch surface, and a second position in which the friction shoes are disengaged from the clutch surface, the biasing springs biasing the friction shoes toward their first positions.

2. The engine starter of claim 1, wherein each of the clutch members includes a shoe mount to which a corresponding one of the friction shoes is fixedly coupled.

3. The engine starter of claim 1, wherein each of the clutch members comprises a centrifugal counterweight, wherein the centrifugal counterweights are configured to pivot the clutch members about their respective pivot pins to move the friction shoes into their second positions when the disk rotates in a predetermined rotational direction and at a predetermined rotational speed.

4. An engine starter comprising:
a starter motor having an output shaft;
a pinion fixed to the output shaft and driven by the starter motor;
a ring gear meshingly engaged to the pinion;
a shoe-engagement structure coupled to the ring gear;
a flex plate that is adapted to be coupled to an engine crankshaft for common rotation;
an arm pivotably coupled to the flex plate by a pivot pin for pivoting motion about a pivot point, the arm having a shoe and a counter mass; and
a spring biasing the arm about the pivot point to urge the shoe toward the shoe-engagement structure;
wherein the counter mass is configured to counteract the spring and drive the shoe away from the shoe-engagement structure when a rotational speed of the flex plate is greater than or equal to a predetermined rotational speed.

* * * * *